Aug. 9, 1960  A. A. COLLIER  2,948,543
RUNNER ASSEMBLY FOR AGRICULTURAL IMPLEMENTS
Filed Aug. 6, 1957  2 Sheets-Sheet 1
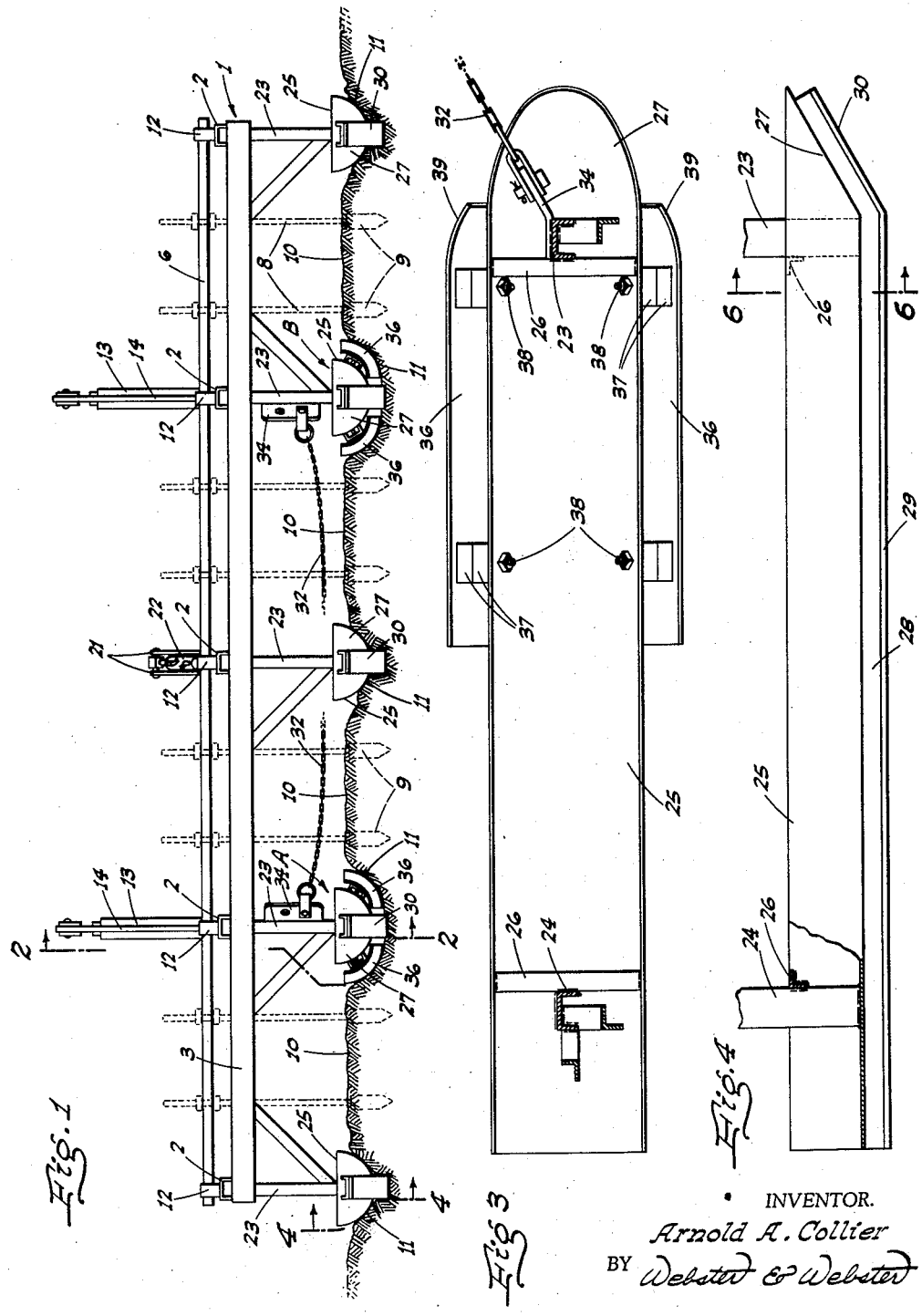
INVENTOR.
Arnold A. Collier
BY Webster & Webster
ATTYS.

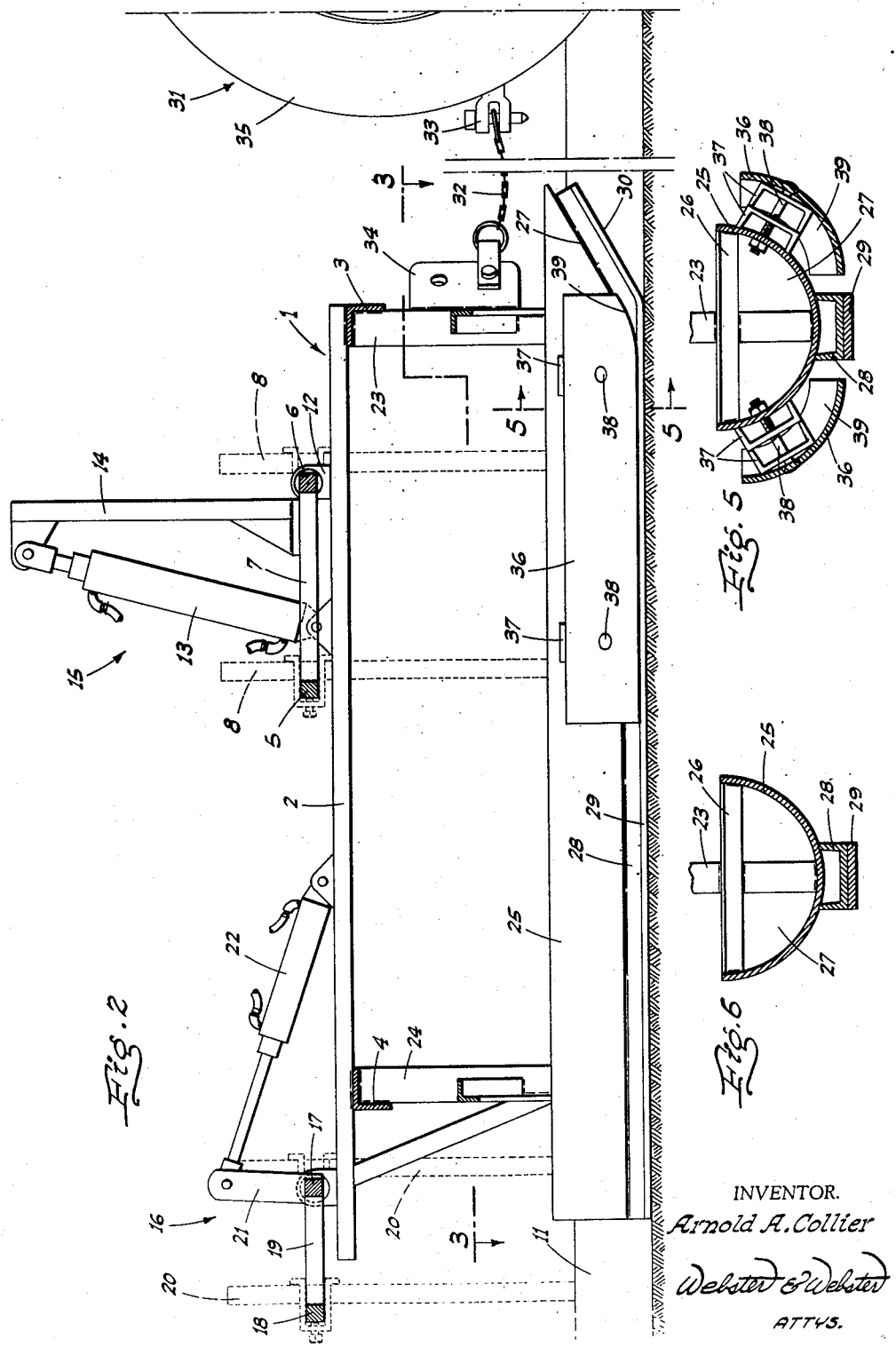

United States Patent Office 2,948,543
Patented Aug. 9, 1960

2,948,543

RUNNER ASSEMBLY FOR AGRICULTURAL IMPLEMENTS

Arnold A. Collier, P.O. Box 175, Dixon, Calif.

Filed Aug. 6, 1957, Ser. No. 676,537

4 Claims. (Cl. 280—8)

This invention relates in general to improvements in an agricultural implement of the kind drawn by a rubber-tired tractor, and which implement is employed to cultivate the soil in fields wherein row crops are grown in equally spaced ridges having parallel furrows therebetween.

A major object of the present invention is to provide a novel runner assembly for such an agricultural implement; the runner assembly self-tracking in the furrows in order to effectively support the implement, to stear the implement independently of the tractor, and to permit setting of the cultivator tools to run in longitudinal paths close to the row crops, yet without danger of lateral shifting of said tools and resultant crop damage.

Another important object of this invention is to provide a runner assembly, as above, which includes a plurality of longitudinally extending transversely spaced runners or floats of novel construction and function; such runners each being generally trough-like, closed at the forward end, and having a central guide skid on the bottom.

A further object of the invention is to provide a runner assembly, for the purpose described, wherein the runners which engage in the furrows traversed by the rubber-tired wheels of the tractor are fitted with supplemental runners to compensate for the compaction of the soil and increase in transverse width of said furrows caused by passage of such wheels.

It is also an object of the invention to provide a runner assembly, for an agricultural implement, which is designed for ease and economy of manufacture, and effective service for the intended purpose.

Still another object of the invention is to provide a practical, reliable, and durable runner assembly for agricultural implements, and one which will be exceedingly effective for the purpose for which it is designed.

These objects are accomplished by means of such structure and relative arrangement of parts as will fully appear by a perusal of the following specification and claims.

In the drawings:

Fig. 1 is a front end elevation of an agricultural implement embodying the novel runner assembly.

Fig. 2 is an enlarged longitudinal sectional elevation taken on line 2—2 of Fig. 1.

Fig. 3 is a fragmentary sectional plan view taken on line 3—3 of Fig. 2 and showing one of the runners which travels in the same furrow as a rubber-tired wheel of the tractor.

Fig. 4 is a longitudinal elevation, partly broken away, taken on line 4—4 of Fig. 1, and showing one of the runners which travels in a furrow not traversed by a wheel of the tractor.

Fig. 5 is an enlarged fragmentary transverse section taken through the near runner and on line 5—5 of Fig. 2.

Fig. 6 is an enlarged fragmentary transverse section taken on line 6—6 of Fig. 4.

Referring now more particularly to the drawings, and to the characters of reference marked thereon, the present invention is embodied in an agricultural implement which includes an open or skeleton frame, indicated generally at 1; such frame being rectangular in plan and including, at the top, longitudinal side beams 2, a front cross beam 3, and a rear cross beam 4.

The frame 1, carried by the runner assembly to be hereinafter described, supports—adjacent the forward end of said frame—spaced but parallel, transversely extending tool bars 5 and 6 disposed above the plane of the side beams 2, and said tool bars are connected together by tie members 7. Each of the transverse tool bars 5 and 6 is fitted with depending shanks 8 whose lower ends carry the earth working tools 9. Such shanks 8 and tools 9 are set so that they work in predetermined longitudinal pairs; the tools 9 penetrating the ridges 10 in a row crop field over which the implement is traveling and wherein parallel furrows 11 exist between said ridges.

The transverse tool bar 6 is journaled, as at 12, on the top of the frame 1, and transversely spaced power cylinders 13 are connected between the frame 1 and the upper end of substantially radial posts 14 fixed at the lower end to related ones of the tie members 7 adjacent the tool bar 6.

Upon actuation of the power cylinders 13 to extend the same, the transverse tool bar 6 is rotated, with simultaneous upward swinging of the tool bar 5, whereby the related shanks 8 and tools 9 are swung upwardly and rearwardly to clear the ground when desired.

The above described front tool bar assembly, identified generally at 15, has a substantial counterpart at the rear of the implement; the rear tool bar assembly being indicated generally at 16, and including spaced parallel tool bars 17 and 18, tie members 19, tool shanks 20, a post 21, and a power cylinder 22; the post 21 and the power cylinder 22 being somewhat modified but serving exactly the same purpose as in the front tool bar assembly 15.

A plurality of rigid, transversely spaced front legs 23 and corresponding longitudinally alined rear legs 24 are included in the frame 1 and project downwardly from the top portion of said frame 1; such legs being suitably braced, as shown. The pairs of said longitudinally alined front legs 23 and rear legs 24 are equally spaced laterally of the frame 1 and so as to be dead-centered above related furrows 11, of the crop field, as the implement advances.

The following runner assembly is mounted in connection with the lower ends of said legs in order to support the implement, to cause it to be self-tracking, and to attain the other advantages hereinbefore described:

The front leg 23 and the rear leg 24 comprising each longitudinally alined pair, project into a trough-like, longitudinally extending runner or float 25 which is half-circle in cross section, whereby to define a convex lower face of 180 degrees in extent. The legs 23 and 24 of each pair are rigidly secured centrally to the corresponding runner 25 as by cross bars 26 and suitable welding; the legs intersecting said cross bars and abutting at their lower ends on the bottom of the runner.

The runners 25 as thus mounted correspond, in their transverse spacing, to that of the parallel furrows 11 and run in such furrows as the implement advances. Each runner 25 is closed at its forward end, being forwardly and upwardly inclined at such end, as at 27, and being round-nosed in plan; the forward end portion of the runners projecting a like distance ahead of the frame 1.

On the bottom thereof and for the full length, each runner 25 is fitted, as by welding, with a central longitudinal guide skid 28 which is rectangular in cross section and of a width much less than the diameter of the runner. Each skid 28 thus projects downwardly from the central bottom portion of the related runner 25, and is formed at the bottom with a wear face 29 of steel resistant to abrasion.

The forward portion of each skid 29 is upturned, as at 30, in matching relation to the forwardly and upwardly inclined closed forward end 27 of the related runner 25.

The implement is attached to the draft tractor, indicated generally at 31, by forwardly converging flexible elements, such as chains 32; the forward end of said chains 32 being attached to the tractor hitch 33, while at their rear ends such chains are coupled to transversely spaced draft plates 34 on certain of the front legs 23 of frame 1.

In the present embodiment there are five of the runners 25, and the intermediate runners—i.e. those between the central runner and the outermost runners—are the ones which travel in the furrows 11 traversed by the rubber-tired rear wheels of the tractor 31; one of such rear wheels being indicated diagrammatically in Fig. 2, at 35.

As such rear wheels 35 of the tractor move forward in the corresponding furrows 11, the latter are compacted and increased in their transverse dimension.

To compensate for this increase in the transverse dimension of the furrows 11 along which the tractor wheels 35 have traveled, the related floats 25, indicated generally at A and B in Fig. 1, are provided with the following supplementary attachment:

Such attachment comprises supplemental runners 36 which are quarter-round in cross section—i.e. of 90 degrees in extent—disposed laterally outwardly of the lower sides of the runners 25, indicated generally at A and B.

The supplemental runners 36, which are symmetrical to—but spaced from—the sides of the related runner 25, are maintained in such position by spacer blocks 37 and tie bolts 38; the number of spacer blocks employed depending on the extent to which the rubber-tired tractor wheels 35 increase the transverse dimension of the related furrows 11. The supplemental runners 36, whose inner or lower edges terminate adjacent the corresponding guide skid 28, are relatively short and occupy a position alongside the forward portion of the corresponding runner 25; the forward ends of said supplemental runners 36 being rounded inwardly, as at 39, to prevent them from digging in.

In use of the implement, the longitudinal runners 25 each travel in a related one of the furrows 11; effectively acting as floats to support the implement frame 1 and the earth working tools 9 carried thereon.

In addition, the runners 25 track in the furrows 11 as the implement advances, with the result that such implement is self-steering. This permits the use of a flexible connection, such as the chains 32, between the tractor 31 and the trailing implement. With such tracking of the runners 25 in related furrows 11, the two of said runners heretofore identified as A and B, and which carry the supplemental runners 36, travel in the furrows compacted and widened by the rubber-tired rear wheels of the tractor running—as aforesaid—ahead of, and in the same furrows as, such runners A and B.

While the runners 25 engage in self-tracking relation in the furrows 11, the longitudinal guide skids 28 sink into or imbed in the bottoms of such furrows, as shown in Fig. 1, whereby to further prevent any lateral deflection or shifting, and which would correspondingly alter the position or longitudinal path of the earth working tools 9 in the ridges 10. This is of advantage, as it permits such earth working tools 9 to run quite close to the crop row on each ridge 10, yet without possibility of damaging the plants.

It will therefore be apparent that this invention provides a high flotation implement which is self-steering, and which when in use—and as it advances in a crop field—automatically maintains proper orientation of the earth working tools 9 to the crop rows growing on the ridges 10 between the furrows 11.

From the foregoing description it will be readily seen that there has been produced such a device as will substantially fulfill the objects of the invention, as set forth herein.

While this specification sets forth the present and preferred construction of the invention, still in practice such deviations therefrom may be resorted to as do not form a departure from the spirit of the invention, as defined by the appended claims.

Having thus described the invention, the following is claimed as new and useful, and upon which Letters Patent are desired:

1. A tillage implement combination for use on a crop field having alternating longitudinal ridges and furrows, said combination comprising a tractor having drive wheels transversely spaced to simultaneously run in certain spaced ones of said furrows, an above-ground frame connected in draft relation to the tractor and adapted to span a plurality of furrows including said certain ones thereof, longitudinal runners corresponding to and tracking simultaneously in such plurality of furrows including said certain ones, means rigidly securing the runners on the frame, the tractor wheels causing widening of said certain ones of the furrows, and supplemental runners on and increasing the effective width of those runners which track in said certain furrows.

2. In a tillage implement adapted to transversely span and to move lengthwise of alternate longitudinal ridges and furrows of a crop field; an above-ground frame adapted to be connected in draft relation to a rubber-tired tractor having wheels which run in certain of said furrows, longitudinal runners corresponding to and tracking in a plurality of the furrows including said certain ones thereof, and means rigidly securing the frame in supported relation on the runners; the tractor wheels causing widening of said certain furrows, and supplemental runners on and increasing the effective width of those runners which track in said certain furrows; the runners being substantially semi-circular in cross section, and the supplemental runners being disposed in spaced relation outwardly of and parallel to the sides of the corresponding runners, and means rigidly connecting the runners and supplemental runners at spaced points in their length.

3. A structure, as in claim 2, in which said last named means includes removable spacer blocks and tie bolts.

4. In a tillage implement adapted to transversely span and to move lengthwise of alternate longitudinal ridges and furrows of a crop field; an above-ground frame adapted to be connected in draft relation to a rubber-tired tractor having wheels which run in and cause widening of certain of said furrows, longitudinal main runners corresponding to and tracking in a plurality of the furrows including said certain ones thereof, means rigidly securing the runners to the frame, the runners being substantially semi-circular in cross section, a central relatively narrow longitudinal guide skid on and depending from the bottom of each runner, supplemental runners extending alongside and on opposite sides of each of the main runners which track in said certain furrows, and means to rigidly secure the supplemental runners to the related main runners; each supplemental runner being of substantially quarter-round form in cross section and having a radius substantially the same as that of the main runner and disposed in symmetrical and spaced relation to the opposite side portions thereof, with the lowermost longitudinal edge of each supplemental runner positioned adjacent and substantially at the level of the lower face of the related skid.

References Cited in the file of this patent

UNITED STATES PATENTS

| | | |
|---|---|---|
| 1,019,803 | Liel | Mar. 12, 1912 |
| 1,047,042 | Gonzales | Dec. 10, 1912 |
| 1,412,164 | Cabrini | Apr. 11, 1922 |
| 1,753,712 | McCready | Apr. 8, 1930 |
| 1,993,105 | Lindsey et al. | Mar. 5, 1935 |
| 2,448,545 | O'Daniel | Sept. 7, 1948 |
| 2,673,511 | Roberts | Mar. 30, 1954 |